(12) United States Patent
Yoshida et al.

(10) Patent No.: US 6,205,202 B1
(45) Date of Patent: Mar. 20, 2001

(54) SUBSCRIBER LINE TESTER

(75) Inventors: Takashi Yoshida; Norio Shimabara, both of Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 09/270,252

(22) Filed: Mar. 15, 1999

(30) Foreign Application Priority Data

Mar. 23, 1998 (JP) .................................................. 10-073633

(51) Int. Cl.⁷ ............................. H04M 1/24; H04M 3/08; H04M 3/22
(52) U.S. Cl. ..................................... 379/27; 379/5; 379/6
(58) Field of Search .................................... 375/226–227; 379/3, 5–6, 21–22, 24–26, 27–29, 30, 32; 324/525–534, 539, 542–543

(56) References Cited

U.S. PATENT DOCUMENTS 4,264,959 * 4/1981 Blaass ..................................... 702/71
4,918,623 * 4/1990 Lockitt et al. ....................... 709/224

* cited by examiner

*Primary Examiner*—Duc Nguyen
(74) *Attorney, Agent, or Firm*—Moonray Kojima

(57) ABSTRACT

A subscriber line tester for communication lines that convey high speed digital data, wherein a transmission side tester is provided that divides a measuring frequency region into two or more blocks, generates multi-sine waveforms obtained by combining sine waveforms of two or more frequencies in each block, and outputs the multi-sine waveforms to the communication line; and a reception side tester is provided that measures the multi-sine waveforms in the most suitable range for each block, and synthesizes a spectrum from each spectrum obtained for each block, so that high speed communication and long time period measurement are improved.

14 Claims, 13 Drawing Sheets

SUBSCRIBER LINE TESTER

BACKGROUND OF THE INVENTION

1. Field of Invention

This invention relates to a subscriber line tester for communication lines, such as telephone lines, that convey high speed digital data; and more particularly, to such a tester that allows high speed communication and measurement over a long period of time.

2. Description of the Prior Art

With conventional communication lines, it is desired to measure various transmission characteristics thereof, such as attenuation, cross talk, and noise. These characteristics are measured by supplying a signal from one end of a "loop under test" of the communication line (called "loop under test") to be tested, and by measuring the signal at the other end of the loop under test.

FIG. 1 shows a conventional subscriber line tester comprising a signal generator 1, such as a tracking oscillator or a sweeping oscillator, connected to one end of a loop under test 100, and a measuring equipment 2, such as a selective level meter or a spectrum analyzer, connected to the other end of the loop under test 100.

Operation of the conventional tester will be described with reference to FIGS. 2 and 3, wherein FIG. 2 shows the attentuation characteristics of the loop under test 100, and FIG. 3 shows the noise characteristics of the loop under test 100. For example, if the attenuation characteristics of the loop under test 100 is to be measured, the frequency of the signal to be outputted to the loop under test 100 is subjected to sweeping by signal generator 1. That signal is propagated through the loop under test 100, and at the other end thereof, the propagated signal is captured by the measuring equipment 2 to obtain a spectrum which is displayed on a display device or the like. The attenuation characteristic shown in FIG. 2 is obtained by such measurement.

In a similar manner, the noise characteristic of the loop under test 100 is measured by supplying a signal to the loop under test 100 using signal generator 1, and then measuring the noise signal input propagated through the loop under test 100 using the measuring equipment 2, and obtaining a spectrum which is displayed in the display means. The noise characteristic shown in FIG. 3 is thus obtained by such measurement.

However, for the subscriber line tester shown in FIG. 1, there is a problem in that the measuring time period is prolonged if the measuring frequency range is wide when measurement is done with the measurement equipment 2 and the signal generator 1. This is because of the necessity to measure levels by automatically capturing selected frequencies or to measure the peaks of a spectrum of varying signal frequency in the maximum value retaining mode when a selective level meter or a spectrum analyzer is used in the measuring equipment 2.

Another problem is that measurement of the transmission characteristic is not simple when the loop under test 100 is long in length, such as being several kilometers, since the loop under test is the loop actually being tested. This is due to the fact that one group of workers must be present at the signal generator 1 location, and another group of workers must be present at the measuring equipment 2 location, and that these two groups must be in communication with each other so that the two groups can simultaneously operate the respective apparatus on both ends of the loop under test 100 when measuring transmission characteristics thereof.

Moreover, an other problem is that when noise is estimated, the accuracy of such estimation depends on human skill at judging the noise spectra. The noise being estimated are often the result of cross talk between communication lines. Thus, noise due to cross talk, for example, requires a better form of measurement.

Furthermore, when noise is generated in a non-steady manner, it is necessary to measure the noise of a long period of time. This creates another problem in that a large amount of data is accummulated as the measurement time elapses. Such accummulation is wastesful and requires a larger memory capacity than otherwise necessary. The amount of accumulated data can be reduced if the measurement is made in a fixed cycle. But, disadvantageously, a non-steady, or random noise might be missed in that case, that is such noise might not be measured properly.

SUMMARY OF THE INVENTION

Accordingly, an object of the invention is to overcome the aforementioned and other deficiencies, disadvantages, and problems of the prior art.

Another object is to provide a subscriber line tester that allows high speed communication and measurement, and long time period measurement of a communication line.

DETAILED DESCRIPTION OF THE PREFERRED EMBODIMENTS

Figure 1:
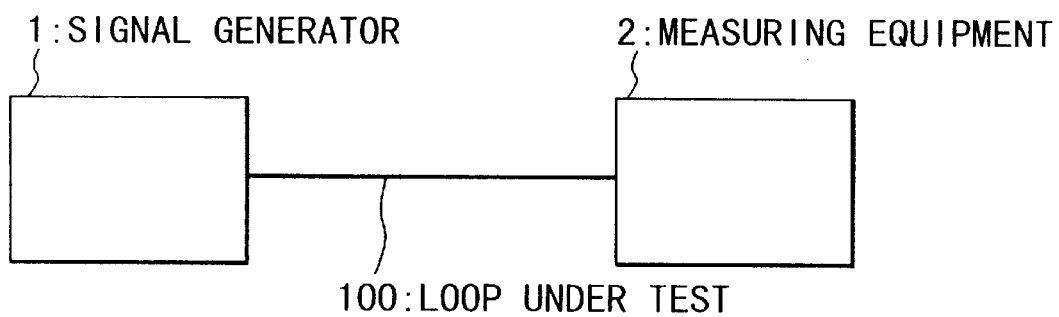
FIG. 1 is a block diagram depicting a conventional subscriber line tester.
Figure 2:
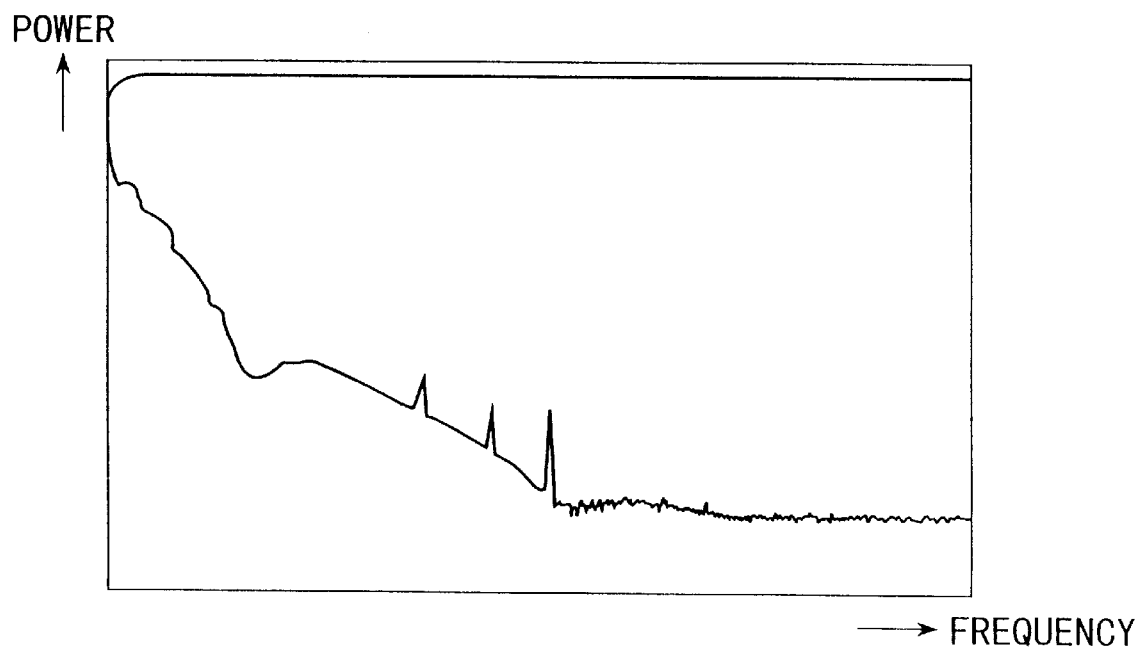
FIG. 2 is a graph depicting an attenuation characteristic of a loop under test.
Figure 3:
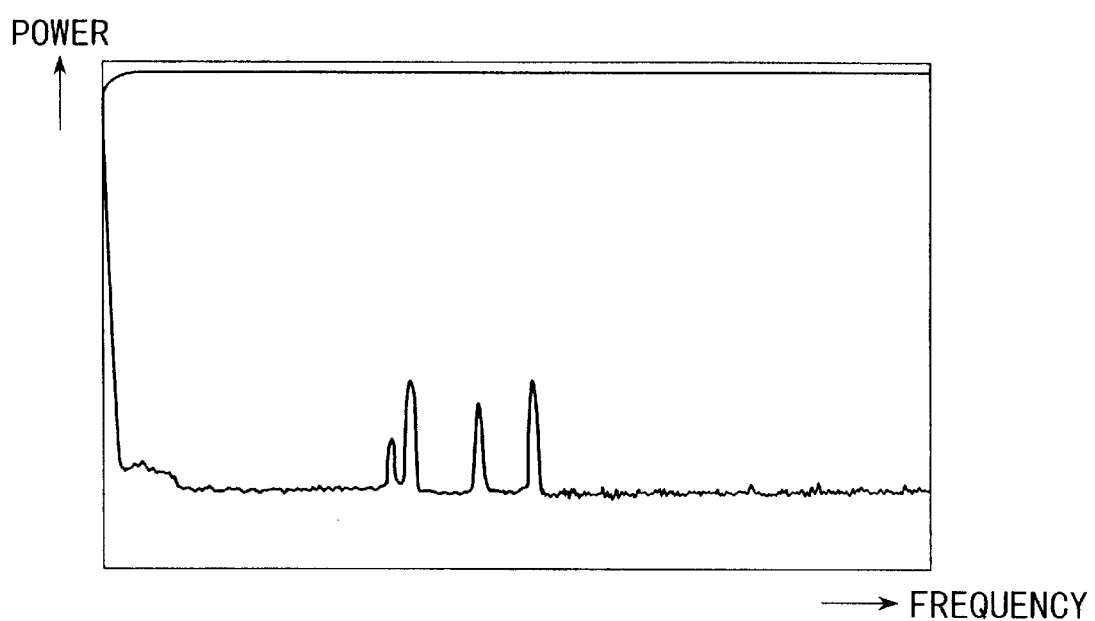
FIG. 3 is a graph depicting a noise characteristic of a loop under test.
Figure 4:
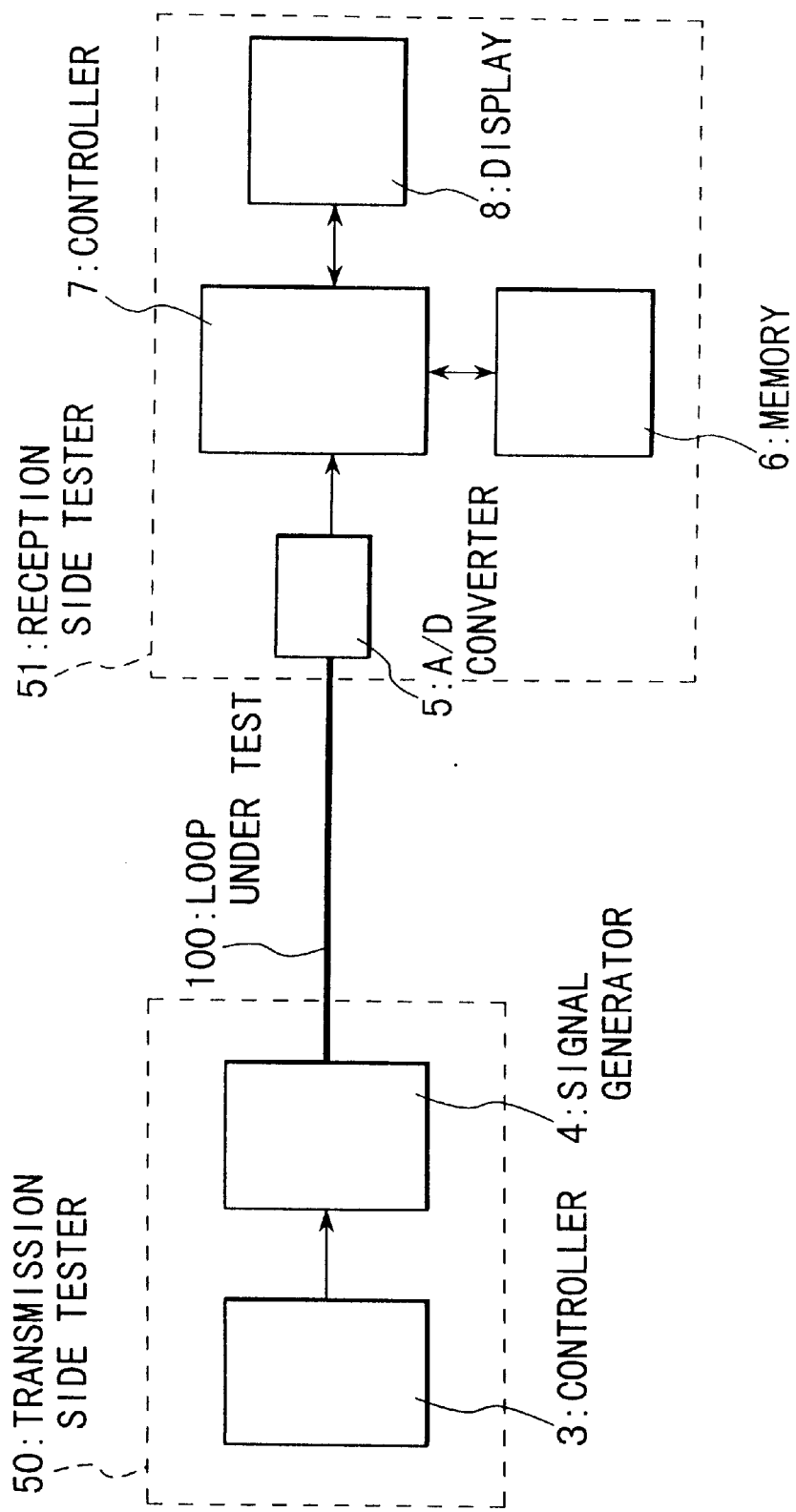
FIG. 4 is a block diagram depicting an illustrative embodiment of the invention.

FIG. 4 shows a subscriber line tester comprising a transmission side tester 50 connected to a reception side tester 51 through a loop under test 100. The transmission side tester 50 comprises a controller 3 connected to signal generator 4. A control signal from controller 3 is supplied to signal generator 4 and the output of signal generator 4 is applied to one end of the loop under test 100. Reception side tester 51 comprises A/D (analog to digital) converter 5 connected to the other end of the loop under test 100 and to controller 7 which has the input terminal and output terminal thereof connected to memory 6 and display 8, respectively.

Figure 5:
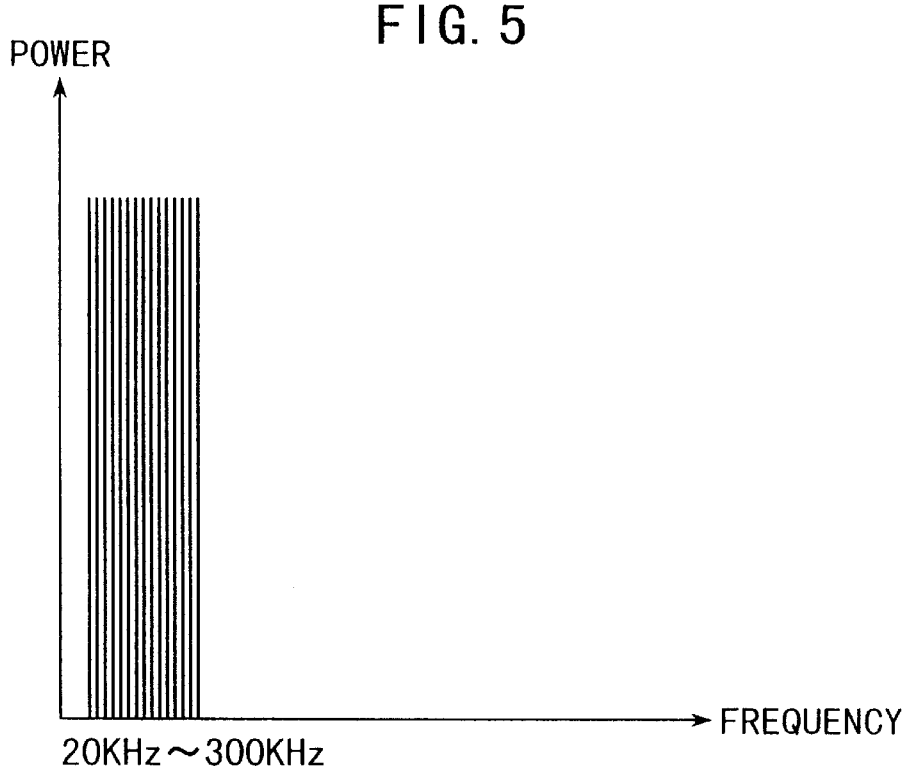
FIG. 5 is a graph depicting a spectrum of a signal outputted from a transmission side tester.
Figure 6:
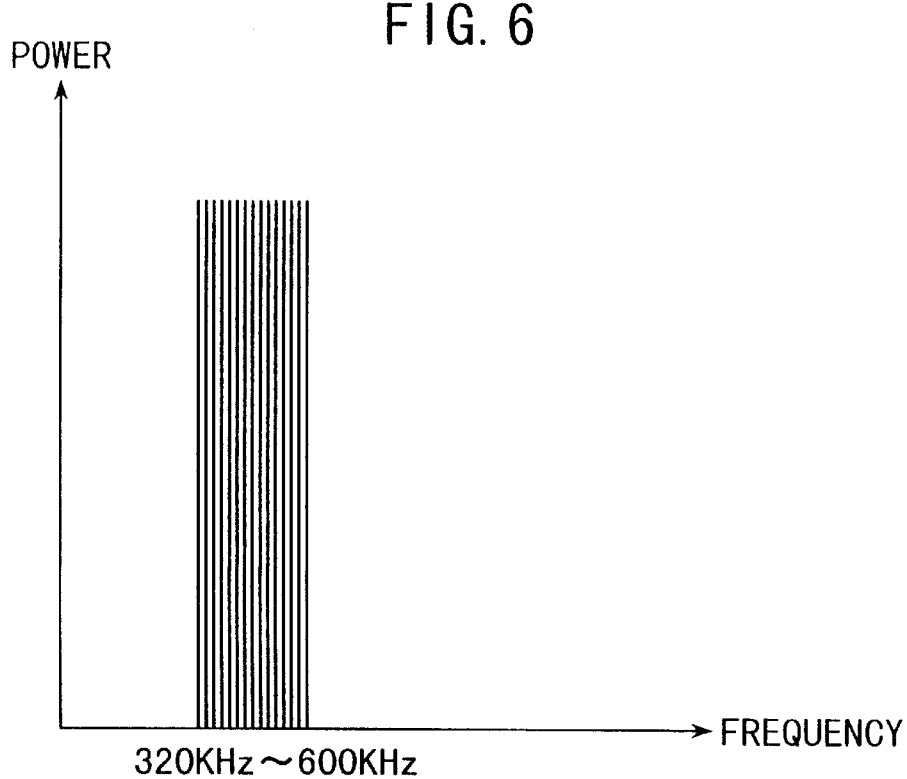
FIG. 6 is a graph depicting the spectrum of another signal outputted from the transmission side tester.
Figure 7:
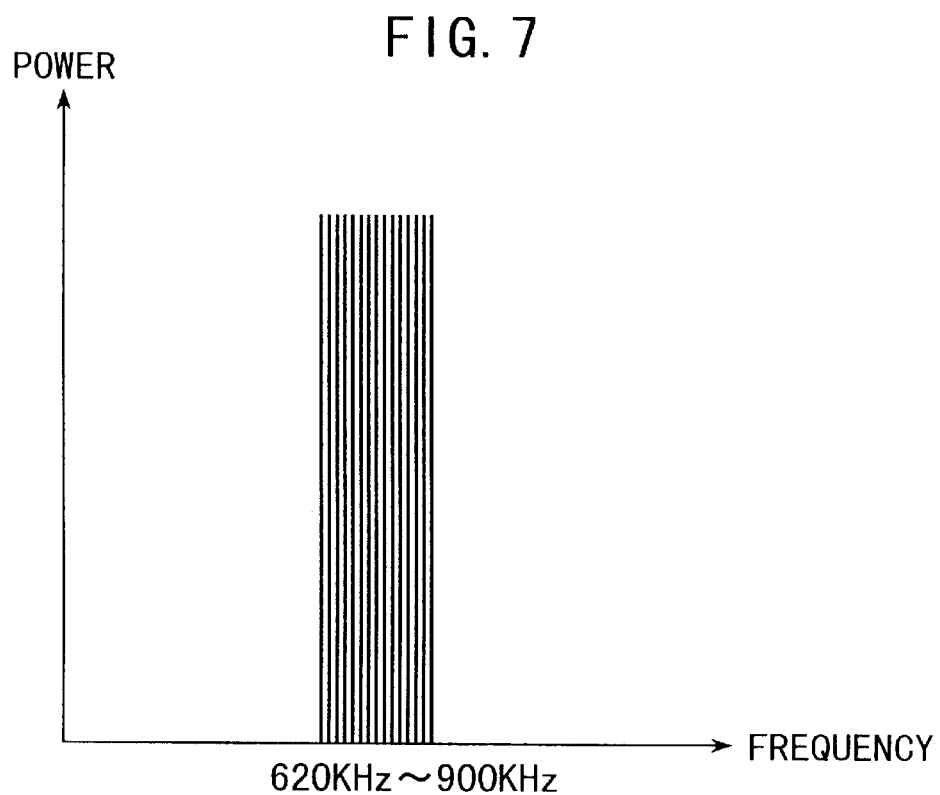
FIG. 7 is a graph depicting the spectrum of a further signal outputted from the transmission side tester.
Figure 8:
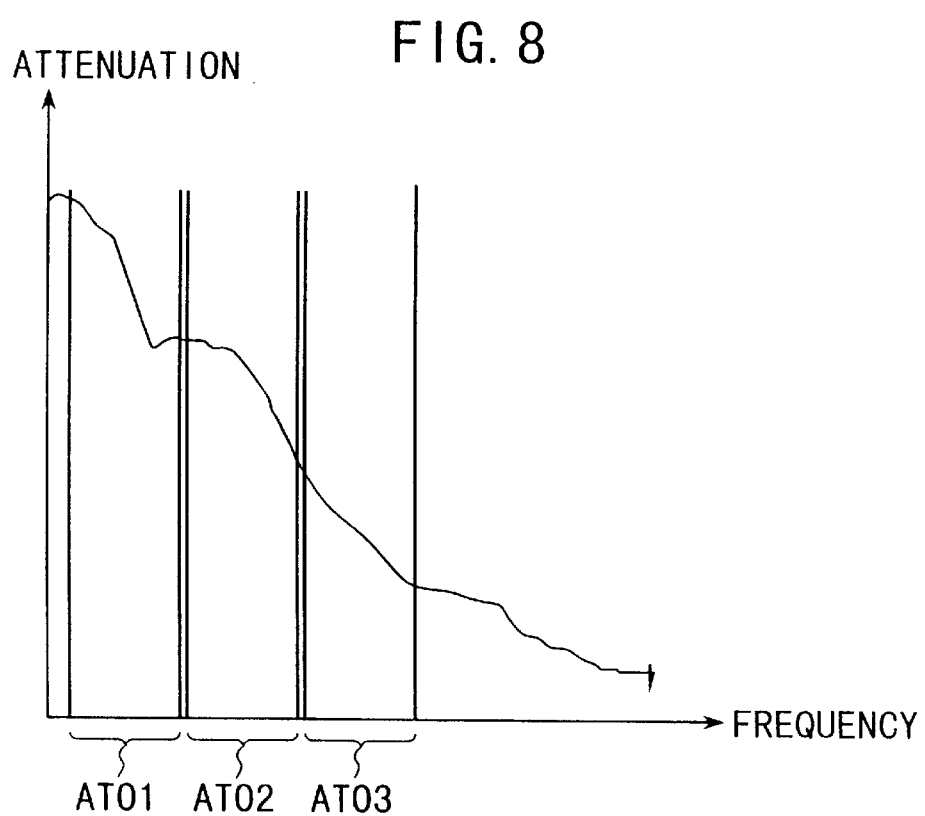
FIG. 8 is a graph depicting an attenuation characteristic of a loop under test.
Figure 9:
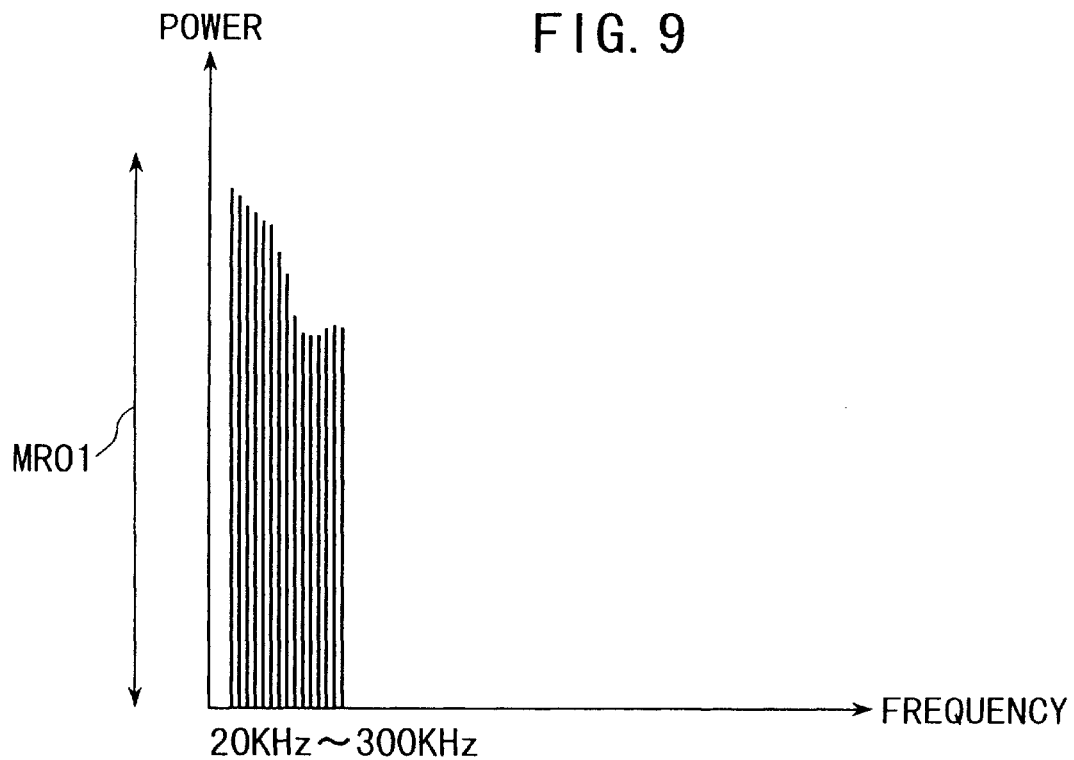
FIG. 9 is a graph depicting the spectrum of a signal measured by the reception side tester.
Figure 10:
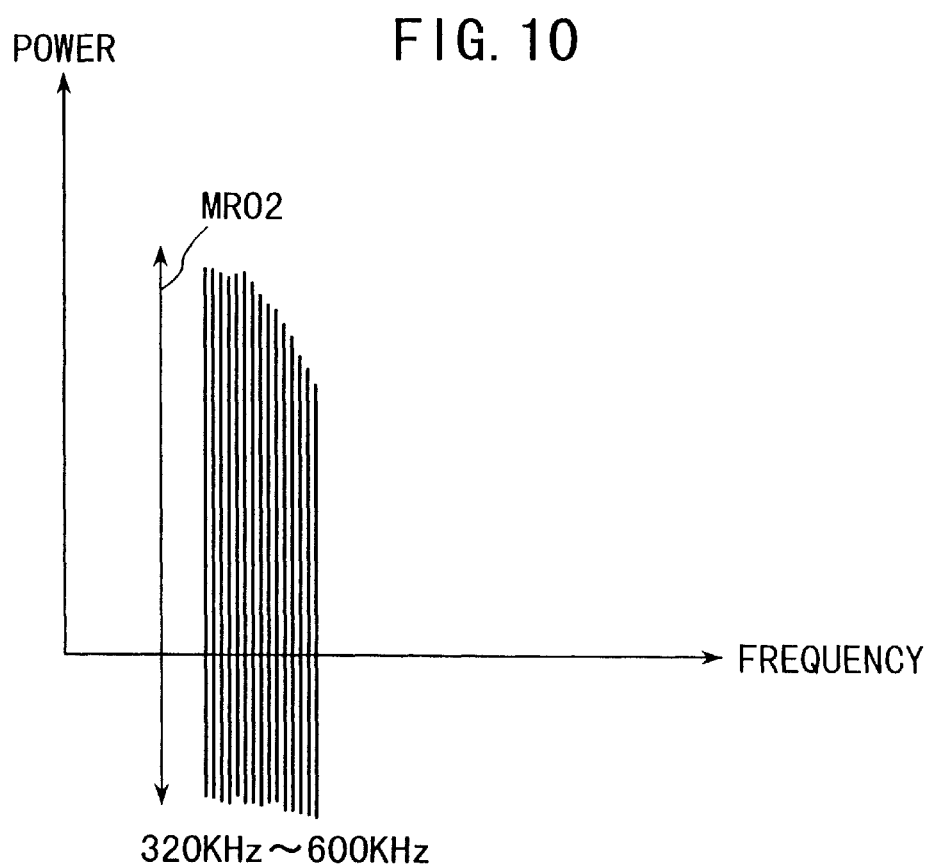
FIG. 10 is a graph depicting the spectrum of another signal measured by the reception side tester.
Figure 11:
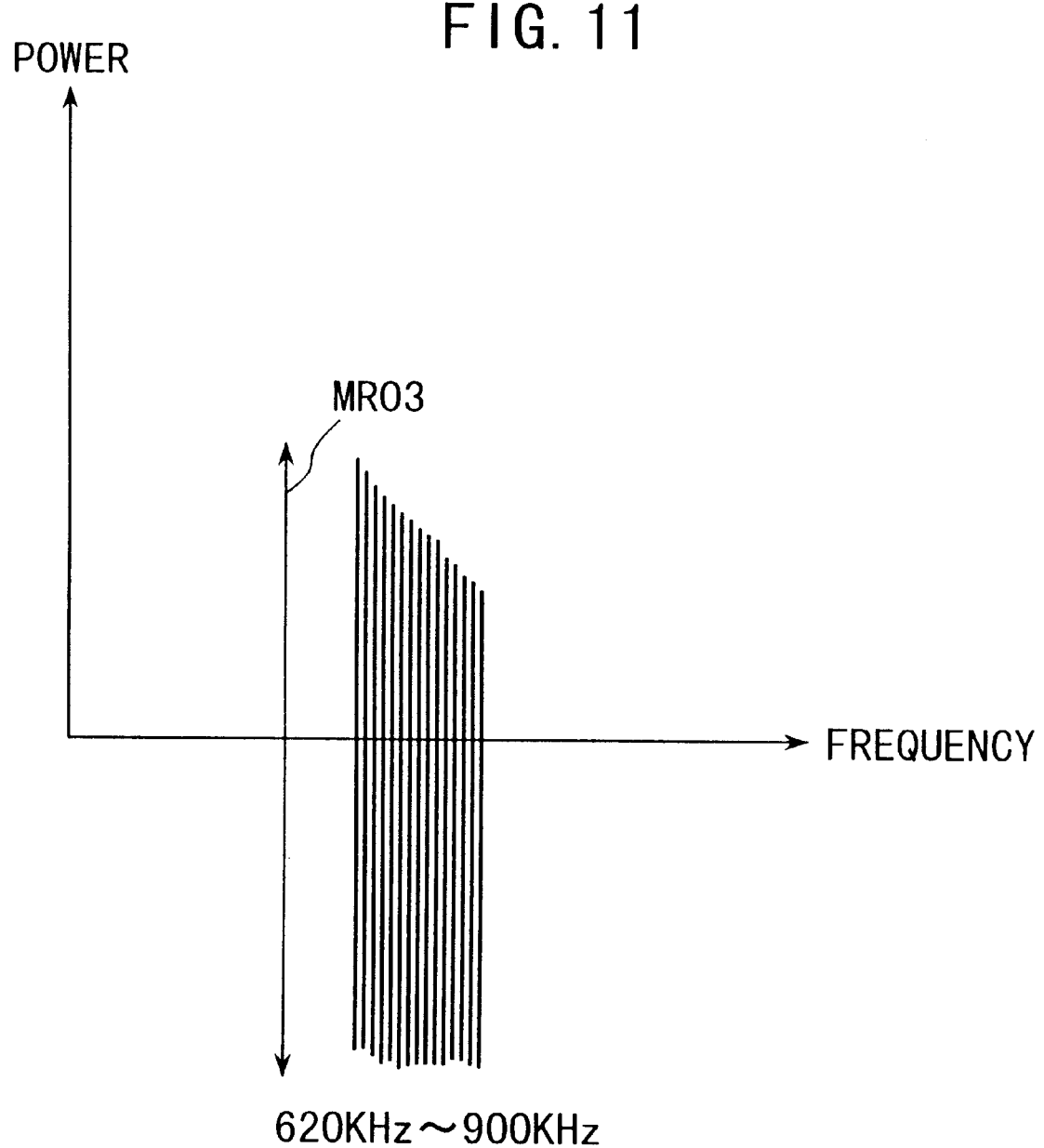
FIG. 11 is a graph depicting the spectrum of a further signal measured by the reception side tester.
Figure 12:
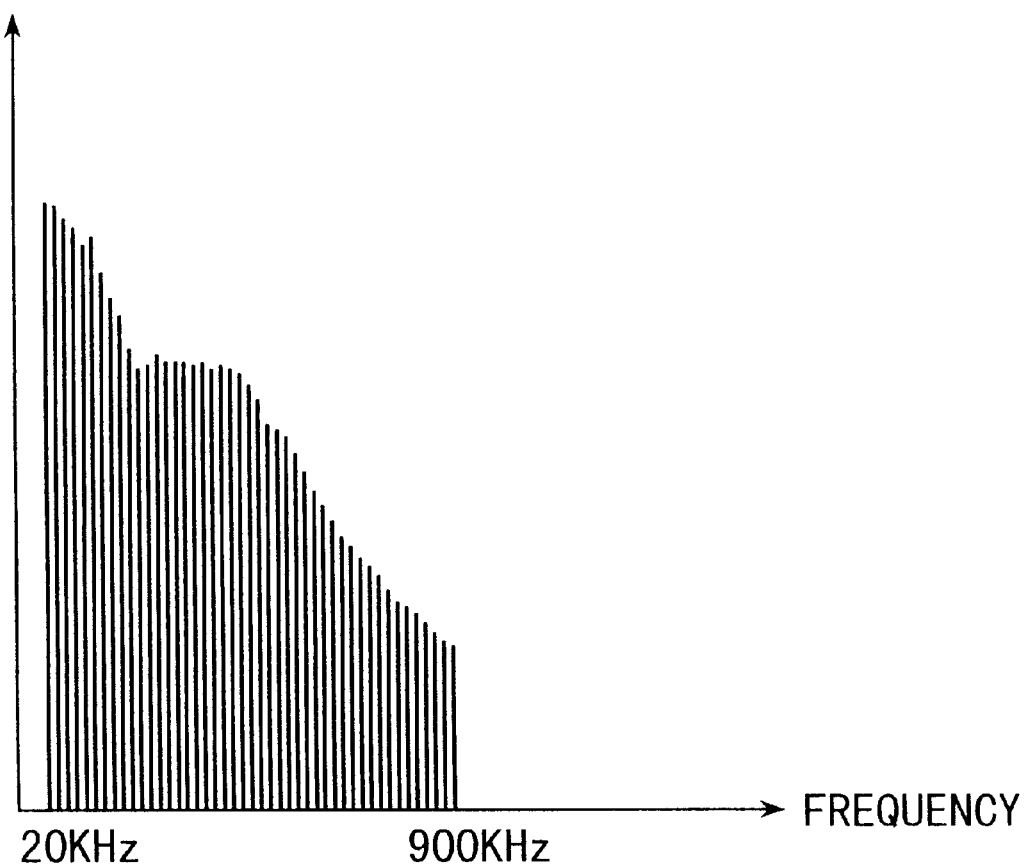
FIG. 12 is a graph depicting a synthesized spectrum.

Operation of the embodiment of FIG. 4 will now be described with reference to FIGS. 5–12, wherein FIGS. 5, 6 and 7 show spectrum of signals outputted by transmission side tester 50; FIG. 8 shows the attenuation characteristic of the loop under test 100; FIGS. 9, 10 and 11 show example of each spectrum measured by the reception side tester 51; and FIG. 12 shows an example of a synthesized spectrum.

Controller 3 operates to divide a measuring frequency region into two or more blocks, to generate a multi-sine waveform obtained by combining sine waveforms of two or more frequencies in each divided block, and to output the multi-sine waveform to the loop under test 100 by controlling the signal generator 4. For example, as shown in FIG. 5, a multi-sine waveform, in which sine waveforms of 15 different frequencies, each separated by 20 kHz in the range of 20 kHz to 300 kHz, are combined, is outputted to the loop under test 100.

The multi-sine waveform is attenuated by the attenuation characteristic in the part, shown by part AT01 in FIG. 8, corresponding to the range of 20 kHz to 300 kHz and inputted to the reception side tester 51. A spectrum, for example as shown in FIG. 9, is obtained by acquiring the input signal via A/D converter 5 and applying Fourier transform processing (called "FFT processing") to the signal in controller 7. Controller 7 stores the obtained spectrum in memory 6. Controller 7 may apply either FFT processing in only the range of 20 kHz to 300 kHz , or use only a relevant spectrum after applying FFT processing over all of the measuring frequency range.

Similarly, as shown in FIG. 6 and 7, sine waveforms of 15 different frequencies, each separated by 20 kHz in the ranges of 320 kHz to 600 kHz, and 620 kHz to 900 kHz, are combined, respectively. If the combined waveforms are outputted to the loop under test 100, the combined waveforms are attenuated by each attenuation characteristic shown as parts AT02 and AT03 in FIG. 8. Each spectrum shown in FIGS. 10 and 11, for example, is obtained respectively by acquiring input signals via A/D converter 5 and applying FFT processing in controller 7. Controller 7 stores the obtained spectra in memory 6. Controller 7 may either apply FFT processing only in the range of 320 kHz to 600 kHz and 620 kHz to 900 kHz, or use only relevant spectra after applying FFT processing across the entire measurement frequency range. Since the attenuation becomes large as the frequency range shifts to the higher frequency side in the attenuation characteristic shown in FIG. 8, the amplitude of the signal received by reception side tester 51 becomes small as the frequency range shifts to the higher frequency side. For this reason, controller 7 switches the measuring range to that of higher sensitivity as the frequency range shifts to the higher frequency side.

In other words, controller 7 applies FFT processing to input multi-sine waveforms in a measuring range in which the amplitude of the peak is not saturated using the automatic ranging function. For example, the reception side tester 51 provides measurement in the measuring range shown by distance MR01 in FIG. 9 to obtain the spectrum shown in FIG. 9. The reception side tester 51 provides measurement in the measuring ranges shown by distances MR02 and MR03, respectively, in FIGS. 10 and 11, to obtain the spectra shown in FIGS. 10 and 11 respectively.

Finally, when measurement of all measuring frequency ranges is completed, controller 7 synthesizes each spectrum, as shown in FIGS. 9, 10 and 11, stored in memory 6. As a result, controller 7 obtains the attenuation characteristic in the range of 20 kHz to 900 kHz, that is, the entire spectum as shown in FIG. 12. Controller 7 stores the obtained attenuation characteristic in memory 6 and displays the attentuation characteristic on display 8, as desired.

The results provide a wider dynamic range because measurement is advantageously made in a measuring range which is most suitable for each divided block obtained by the following procedure; dividing a measuring frequency region into two or more blocks, generating each multi-sine waveform obtained by combining two or more sine waveforms in each divided block, and then outputting the multi-sine waveforms to the loop under test 100.

In addition, the measuring time can be shortened even if the measuring frequency range is wide. This is because frequency sweeping for a signal is not necessary, and the measured results are processed in each frequency range obtained by dividing a frequency range into two or more blocks. Moreover, each spectrum for each block is synthesized into one spectrum.

Figure 13:
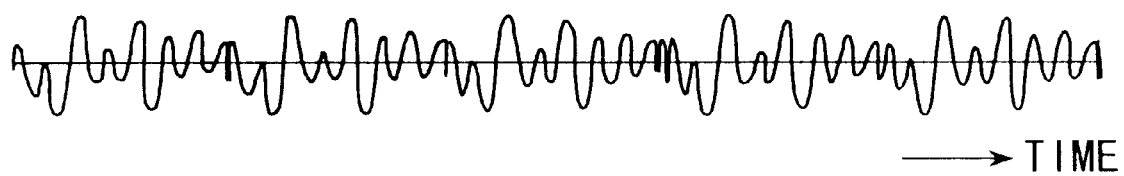
FIG. 13 is a graph depicting the waveform when the same multi-sine waveforms are repeatedly generated.

FIG. 13 shows a waveform wherein the same multi-sine waveform is generated repeatedly. As shown in FIG. 13, even a relatively low cost reception side tester, whose fFT processing speed is slow,can still provide a wide dynamic range of measurement in a short period of time using the following procedure: generating the same multi-sine waveforms repeatedly in transmission side tester 50, and applying FFT processing after reducing the measuring noise by performing averaging processing to the multi-sine waveforms in the reception side tester 51.

Figure 14:
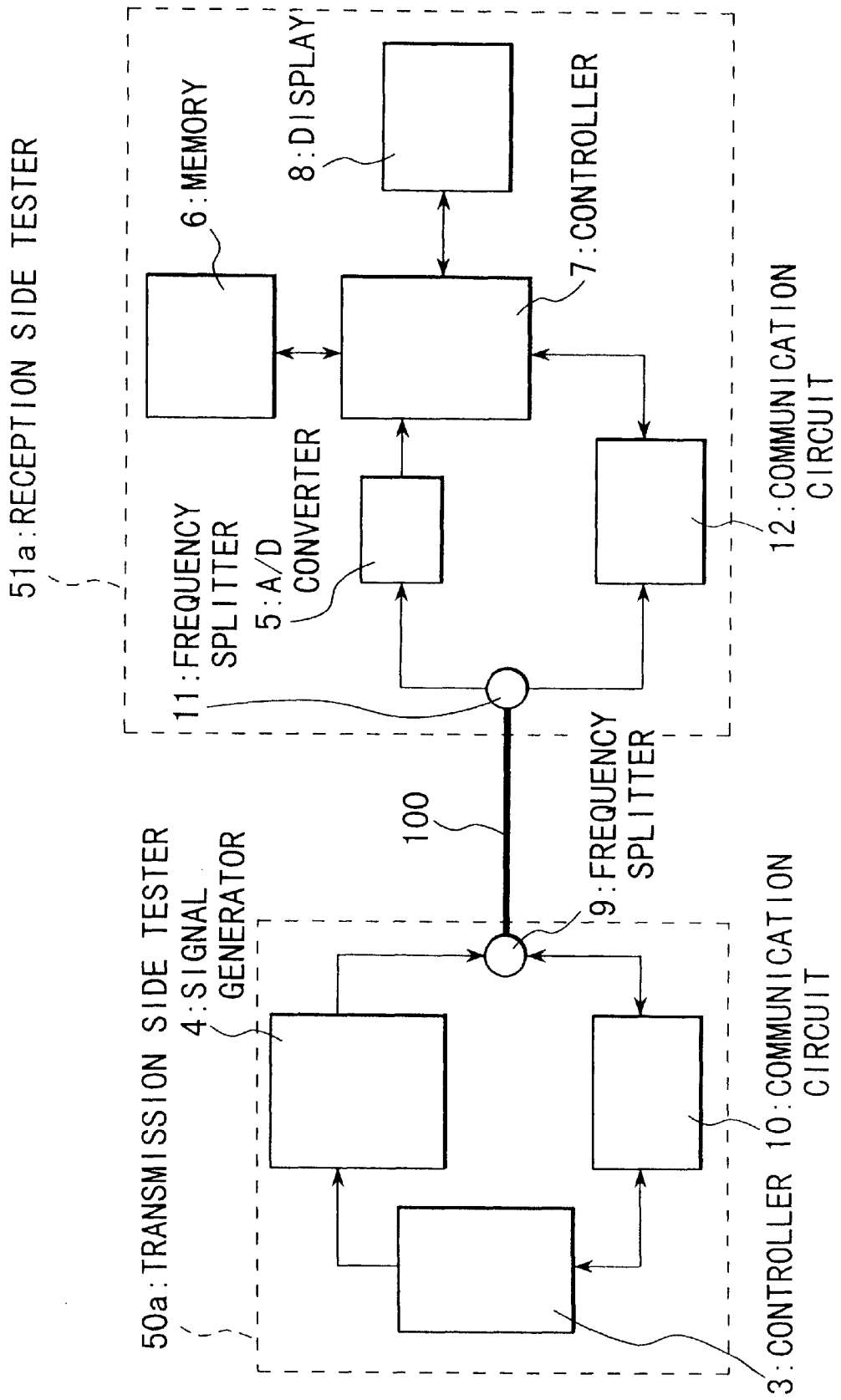
FIG. 14 is a block diagram depicting another illustrative embodiment of the invention.

FIG. 14 shows another illustrative embodiment of the invention wherein problems arising when the loop under test 100 is long in physical length, such as several kilometer, are resolved. In FIG. 14, the same symbols as those in FIG. 4 are used for the same components, such as components 3 to 8 and 100. In addition, there are provided frequency splitters 9 and 11, communication circuits 10 and 12, such as modems. Also, transmission side tester comprises components 3, 4 9 and 10, and reception side tester 51a comprises components 5 to 8, 11 and 12.

In transmission side tester 50a, a control signal from controller 3 is supplied to signal generator 4, and the input terminal and the output terminal of communication circuit 10 are connected to controller 3. The output terminal of signal generator 4 and the input terminal and the output terminal of communication circuit 10 are connected to one end of the loop under test 100 via frequency splitter 9. In the reception side tester 51a, A/D converter 5 and the input terminal and the output terminal of communication circuit 12 are connected to the other end of the loop under test 100 via frequency spitter 11. The output terminal of A/D converter 5 and the input terminal and the output terminal of communication circuit 12 are also connected to controller 7. The input terminal and the output terminal of controller 7 are connected to both memory 6 and display 8, respectively.

The operation of the embodiment of FIG. 14 will now be described with reference to FIG. 15 which show flow diagrams for operation of the transmission side tester 50a and the reception side tester 51a. Also, the flow diagrams show the case where the transmission side tester 50a is operated as the slave, and where the reception side tester 51a is operated as the master.

First, as shown by Step MS01, reception side tester 51a outputs a command which makes the transmission side tester 50a the slave, and generate multi-sine waveforms of 20 kHz to 300 kHz, to the loop under test 100 via frequency splitter 11, by controlling communication circuit 12 with controller 7.

As shown by Step SS01, transmission side tester 50a acquires the command transmitted through the loop under test 100 by separating the command with frequency splitter 9 into communication circuit 10 to receive the command. Then, as shown by Step SS02, controller 3 causes signal generator 4 to generate multi-sine waveforms of 20 kHz to 300 kHz by controlling signal generator 4 according to the command and to output multi-sine waveforms to the loop under test 100 via frequency splitter 9. Concurrently, as shown by Step SS03, controller 3 outputs a "generation notice" for the specified multi-sine waveforms to the loop under test 100 via frequency spitter 9 by controlling the communication circuit 10.

As shown by Step MS02, reception side tester 51a acquires the "generation notice" transmitted through the loop under test 100 into communication circuit 12 by separating the "generation notice" with frequency splitter 11 to receive the "generation notice". Controller 7 acknowledges the "generation notice" and then, as shown by Step MS03, applies measuring processing, such as FFT processing, to the multi-sine waveforms of 20 kHz to 300 kHz, as described above. When a series of measuring processing is completed, as shown by Step MS04, the reception side tester 51a outputs a command similar to that above described. The command causes the transmission side tester 50a, which is the slave, to generate multi-sine waveforms of 320 kHz to 600 kHz at this time, to the loop under test 100 via frequency splitter 11, by controlling communication circuit 12 with controller 7.

As shown by Step SS04, the transmission side tester 50a acquires the command transmitted through the loop under test 100 by separating the command with frequency splitter 9 into communication circuit 10 to receive the command.

Then, as shown by Step SS05, controller 5 causes the signal generator 4 to generate multi-sine waveforms of 320 kHz to 600 kHz by controlling generator 4 according to the command and to output multi-sine waveforms to the loop under test 100 via frequency splitter 9. Concurrently, as shown by Step SS06, controller 3 outputs a "generation notice" for the specified multi-sine waveforms to the loop under test 100 via frequency splitter 9 by controlling the communication circuit 10. Then, as shown by Step MS05, the reception side tester 51a acquires the "generation notice" transmitted through the loop under test 100 into communication circuit 12 by separating the "generation notice" with frequency splitter 11 to receive the "generation notice". Controller 7 acknowledges the "generation notice" and then, as shown by Step MS06, applies measuring processing, such as FFT processing, to the multi-sine waveforms of 320 kHz to 600 kHz as above described. In this regard, if a V0.34 modem or the like, is used as the communication circuit 10 and 12, since its signal band is 4 kHz or less, there is no interference with multi-sine waveforms of 20 kHz or more that are measured.

Figure 15:
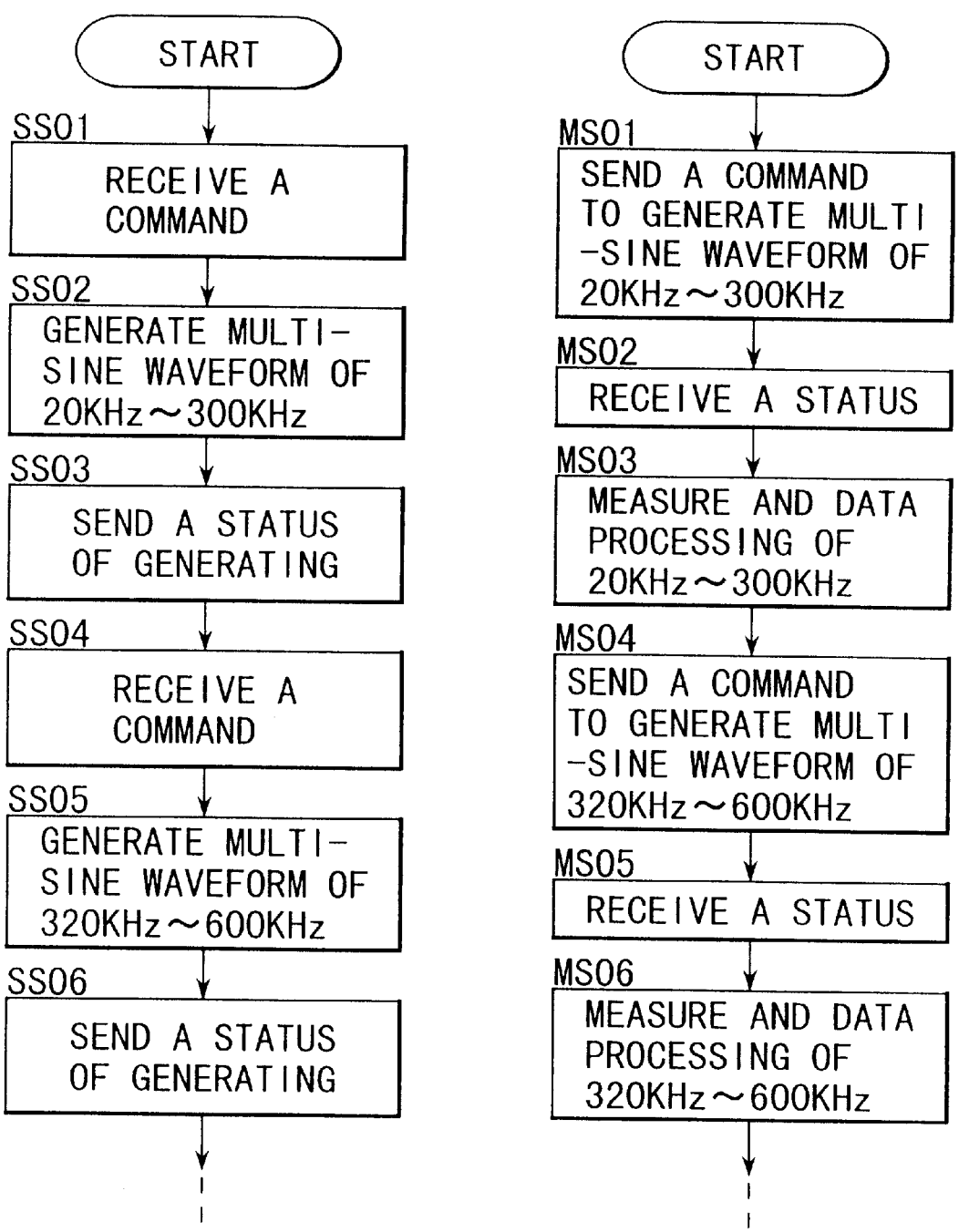
FIG. 15 are flow diagrams depicting operation of the transmission side tester and the reception side tester.

Consequently, in the case of FIG. 15, it is sufficient to assign only one group of personnel to the side performing the master function, that is to the reception side tester 51a, under the following conditions: low frequency communication is implemented through the loop under test 100 using communication circuit 10 disposed in the transmission side tester 50a and the communication circuit 12 disposed in the reception side tester, and synchronizing the multi-sine waveform generation processing and the measuring processing on both the transmission and the reception sides. Also, the measurement itself of the transmission characteristic becomes easy since such measurement can be carried out automatically.

When the noise characteristic of the loop under test is measured, noise source can be estimated without being affected by the degree of skill of the human operator in judging the noise spectra. This is accomplished by overwriting a typical noise spectrum on the screen of the display device where the noise characteristic is displayed.

Figure 16:
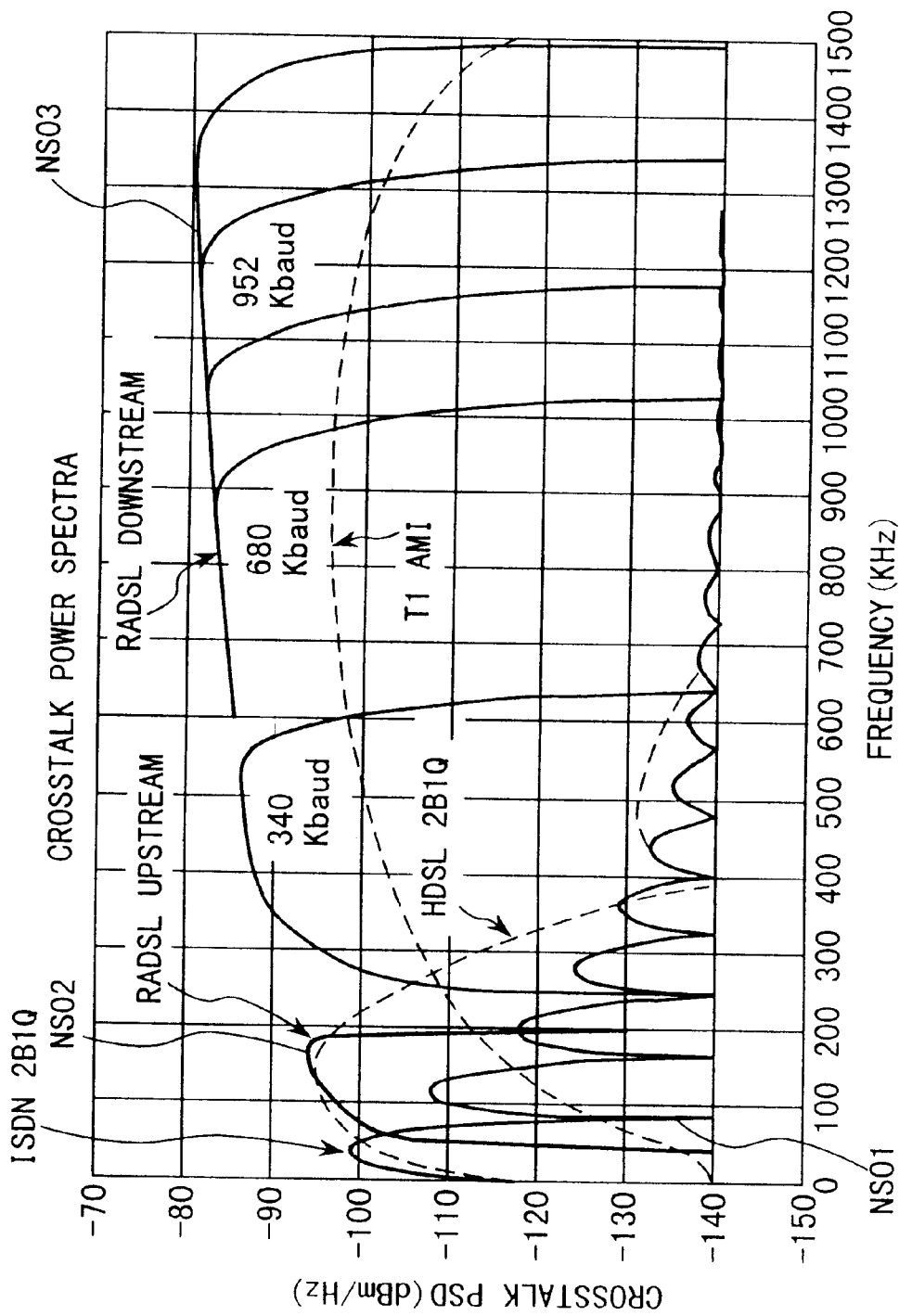
FIG. 16 is a graph depicting typical noise spectra caused by several different types of cross talk.

FIG. 16 shows typical noise spectra caused by several types of cross talk. Hence, the sources of the noise caused by cross talk transmitted into the loop under test 100, can be estimated by over-writing typical noise spectrum, due to several types of cross talk, as shown in FIG. 16, on the screen of the display where the noise characteristic is displayed. For example, if the noise spectrum having the feature shown by curve NSO1 in FIG. 16 is superimposed on the noise characteristic, it can be estimated that the cross talk is being caused from the ISDN (USA). Also, for example, if the noise spectra having the features shown by curve NS02 and curve NS03 in FIG. 16 are superimposed on the noise characteristic, it can be estimated that the cross talk is being caused by noise from the transmitting and receiving Asymmetric Digital Subscriber Line (ADSL) signals. As a result, when the noise characteristic of the loop under test 100 is measured, the dependence of the measured results on an operator's skill in judging noise spectra is completely avoided. This is done in the invention by overwriting one or more typical noise spectra on the screen of a display where the measured noise characteristic is otherwise displayed alone.

Figure 17:
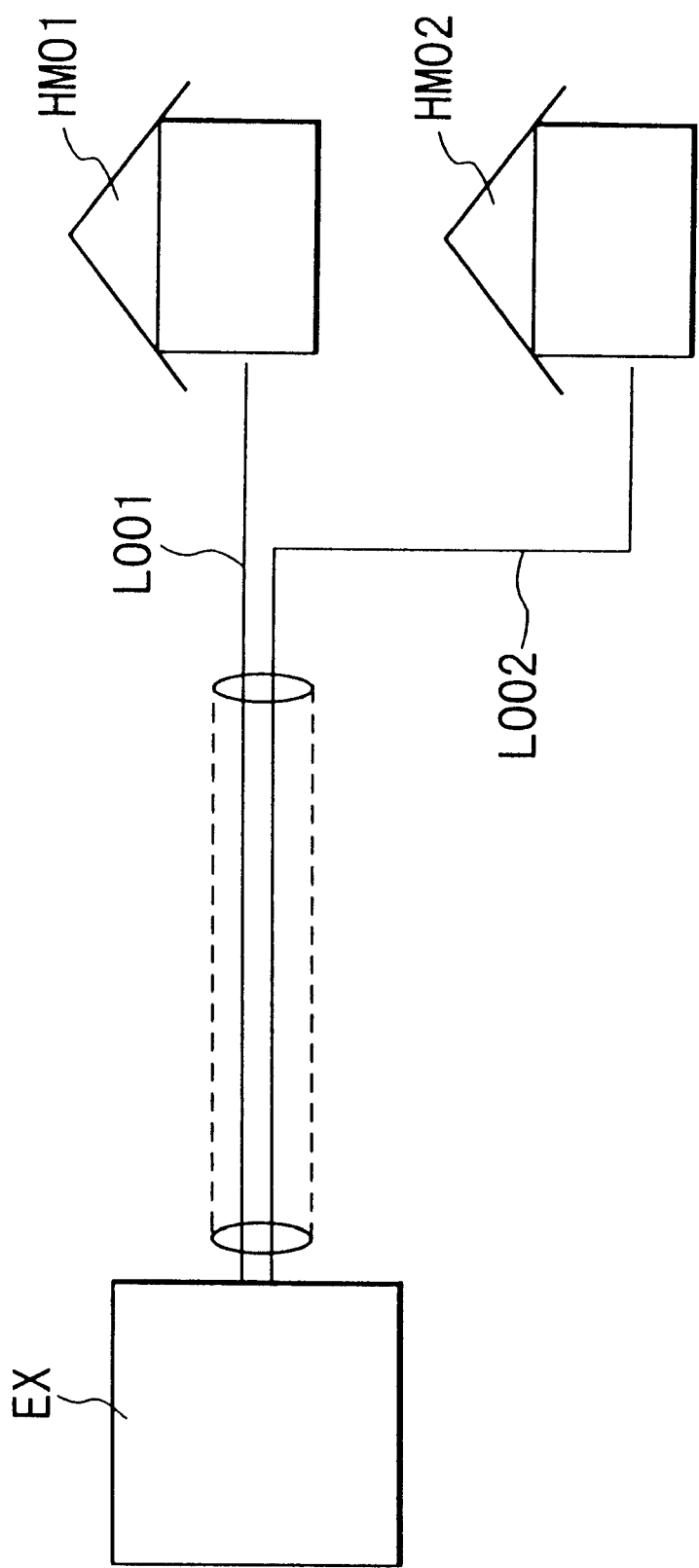
FIG. 17 is an illustration depicting a non-steady noise generating status.
Figure 18:
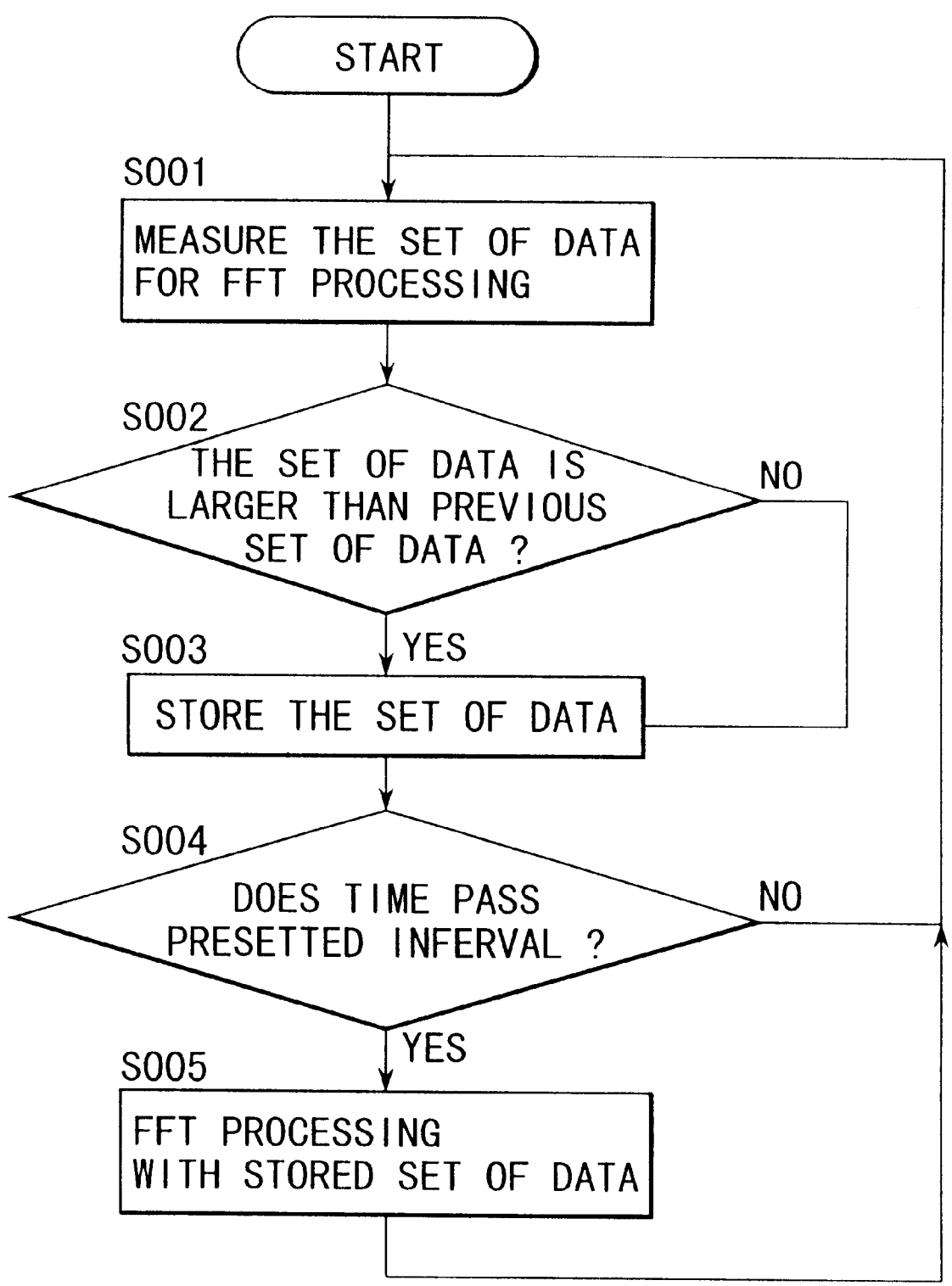
FIG. 18 is a flow diagram depicting operation of the reception side tester.

FIGS. 17 and 18 show a subscriber line tester that has less accumulated data and concurrently is able to capture non-steady noise. Description of the basic configuration is omitted since it comprises elements similar to those contained in the reception side tester 51 of FIG. 4. FIG. 17 shows an example of the non-steady noise generating status. FIG. 18 shows a flow diagram of the operation of the reception side tester 51.

As an example, assume that two or more communication lines are wired from an exchange and that communication lines L001 and L002 are wired to houses HM01 and HM02. Furthermore, assume that the communication line L002 is not used on weekdays but is only used on holidays, and noise caused by use of communication line L002 is induced in communication line L001 due to cross talk. In that case, cross talk noise is not superimposed on the signal through communication line L001 on weekdays, but, is superimposed on holidays. In other words, the non-steady noise cannot be captured or detected unless the noise is measured over a time period of an entire week. Here we assume that the week end is a holiday.

In this example, a reception side tester 51 is installed in house HM01. Controller 7 measures the number of data necessary for FFT processing as a unit of a set of data, by controlling the A/D converter 5 as shown by Step S001 in FIG. 18. Next, as shown by Step S002, controller 7 compares the set of data measured at this instant of time with the set of data measured previously. If the amplitude value of the set of data measured at this time is larger, the controller 7 temporarily stores the set of data measured at this instant of time in memory 6 in place of the previously measured set of data as shown by Step S003. Also, the controller 7 judges whether a preset interval has passed or not, as shown by Step S004. If the present interval has not passed, the controller 7 returns to the processing shown by Step S001. On the other hand, if the preset interval has passed, the controller 7 applies FFT processing to the set of data stored in memory 6 and stores the processed result in memory 6, as shown by Step S005, and then returns to the processing shown by Step S001.

As an example, if it is assumed that the preset interval is 10 minutes and measurement is continued for one week, only one spectrum, that is the maximum noise spectrum in one preset interval of 10 minutes, is stored in memory 6 in that preset interval. Accordingly, data accumulated with measuring time does not become large as in the case where the measured data is simply accumulated in memory 6 and only the maximum noise spectrum in a preset interval is stored. Hence, failure to capture or detect non-steady noise is prevented from occuring. As a result, the amount of accumulated data is small even when measuring noise characteristics over a long period of time, and failure to capture or detect non-steady noise can be prevented by employing the following technique: determining the data required for FFT processing for the maximum amplitude value within the preset interval, and accumulating the noise spectra obtained by the FFT processing for the data in turn.

Furthermore, advantageously, althoughmulti-sine waveforms are generated in the transmission side tester 50, as described with reference to FIG. 4, Discrete Multi-Tone (DMT), Quadrature Amplitude Modulation (QAM) or Orthogonal Frequency Division Multiplex (OFDM) may also be used. Also, the display may comprise various types of displays including those with screens. Other types of measuring devices may be used.

In FIG. 14, although the transmission side tester 50a and the reception side tester 51a are caused to be the slave and master, respectively, the roles can also be reversed. Another method which can be used is when transmission side tester 50a receives a "completion notice" for the FFT processing sent from the reception side tester 51a, the transmission side tester 50a can cause the signal generator to generate the next multi-sine waveforms and to output the waveforms. The measured results may also be sent to a tester on the side at which an operator is located via the loop under test 100 to display the results in the display located in the tester on that side. Also, the measured results may be sent to an office, or the like, located in a remote location where the measured data is managed via the loop under test 100, or other communication line, to display the data. In the former case, it is unnecessary to identify which tester is the master or slave. On the other hand, in the latter case, it is not necessary for the operator to go to the site.

In FIG. 16, two or more typical noise spectra are simultaneously or concurrently overwritten on the measured noise characteristic. However, each typical noise spectrum may be displayed by being switched one by one in turn by the operation of an input means, such as an operator button, mouse or the like. Since this allows typical noise spectra to be overwritten individually, estimation of noise source becomes relatively easy. Moreover, in the simultaneous or concurrent overwriting scheme, each noise spectrum may be identified by one or more different colors. In this case, identification of simultaneously or concurrently displayed typical noise spectra is relatively easy with the invention.

Advantageously, with the invention, the measuring frequency region is divided into two or more blocks, and a multi-sine waveform obtaining by combining sine waveforms of two or more frequencies is generated in each of the blocks, and the multi-sine waveforms are outputted to the loop under test. Thus, the dynamic range is widened because measurement is done in the most suitable range for each divided block. Also, the measuring time can be shortened even when the measuring frequency range is wide. This is because frequency sweeping for a signal is not necessary. Also, the measured results are processed in each frequency range obtained by dividing the frequency range into two or more blocks. Moreover, each spectrum for each block is synthesized into one spectrum.

Also, advantageously, even a relatively low cost reception side tester, whose FFT processing speed is low, can provide a wide dynamic range with a short measurement time by using the following techniques: generating the same multi-sine waveforms repeatedly in the transmission side tester and applying FFT processing after reducing the measuring noise by averaging the multi-sine waveforms in the reception side tester.

Moreover, advantageously, it is possible to use only one operator on the transmission side tester or the reception side tester under the following conditions: low frequency communication is implemented through the loop under test using the communication circuit in the transmission side tester and the communication circuit in the reception side tester, and synchronizing the multi-sine waveform generation processing and measuring processing on both the transmission side tester and the reception side tester. Also, the measurement itself of the transmission characteristics also is easy to accomplish since it is carried out automatically.

Also, advantageously, only one operator is needed on the side which is assigned the role of the master, such as the transmission side tester or the reception side tester, and advantageously, the measurement of transmission characteristics is carried out automatically.

Furthermore, advantageously, with the invention, it is not necessary for the operator to identify which side is the master because the measured results can be sent to the transmission side tester or reception side tester attended by the operator via the communcation line thereby to display the results. Also, advantageously, with the invention, it is not necessary for the operator to go to the measurement site because the measurement results can be sent to a remote location via the communication line to display the results thereat.

Another advantage of the invention is that the noise sources can be accurately identified without depending on an operator's human skill in judging noise spectra, by overwriting a typical noise spectrum on the screen of the display where the measured noise characteristic is being displayed. Moreover, advantageously, with the invention,the sources of noise caused by cross talk in the loop under test can be identified and/or estimated without depending on the human operator's manual skill in judging noise spectra, by simultaneously or concurrently overwriting two or more noise spectra on the screen of the display on which the measured noise characteristics are displayed. In addition, the different typical noise spectra being overwritten can be easily identified with the use of two or more different colors for the different spectrum. Furthermore, advantageously, with the invention, the overwriting can be done serially with one type of noise spectrum first used, and then another type of noise spectrum used thereafter, etc. This can be done by operating an input device and allow the noise sources to thereby be easily estimated or identified. That is to say, each typical noise spectrum is overwritten individually and separately from another typical noise sepctrum.

Furthermore, with the invention, advantageously, the amount of accumulated data is small even when measurement is carried out over a long period of time, and failure to capture or detect non-steady noise is prevented by using the following techniques: determining the data required for FFT processing for the maximum amplitude value within a preset interval, and accumulating the noise spectra obtained by applying FFT processing to the data in turn.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A subscriber line tester for communication lines that convey high speed digital data, said tester comprising:
   a transmission side tester comprising:
      a signal generator connected to one end of a communication line;
      a first controller for controlling said signal generator;
      means for dividing a measuring frequency range into two or more blocks;
      means for generating a plurality of multi-sine waveforms obtained by combining sine waves of two or more frequencies in each block; and
      means for outputting said plurality of multi-sine waveforms to said communication line; and
   a reception side tester comprising:
      an analog to digital converter connected to another end of said communication line for receiving and converting to digital signals said plurality of multi-sine waveforms outputted by said means for outputting of said transmission side tester;
      a memory for storing a plurality of spectra of different multi-sine waveforms;
      a second controller for controlling said analog to digital converter and said memory;
      means under control of said second controller for processing said digital signals representing said plurality of multi-sine waveforms in a most suitable range for each block; and
      means for synthesizing a spectrum from each of said digital signal representing said plurality of multi-sine waveforms obtained for each of said blocks which is compared with said spectra stored in said memory, thereby to test said line.

2. A subscriber line tester for communication lines that convey high speed data, said tester comprising:
   a display having a screen means for causing said display to display measured noise characteristics of a communication line on said screen; and
   means for over-writing a typical noise spectrum of said screen of said display.

3. The tester of claim 2, further comprising means for over-writing two or more types of noise spectrum on said screen of said display.

4. The tester of claim 3, further-comprising means for displaying two or more types of noise spectrum by identifying noise spectrum by color.

5. The tester of claim 2, further comprising means for over-writing one type of noise spectrum on a screen of a display; and means for switching each type of noise spectrum by operating an input means.

6. A subscriber line tester for communication lines that convey high speed digital data, said tester comprising:
   a transmission side tester comprising:
      a signal generator connected to one end of a communication line;
      a first controller for controlling said signal generator;
      means for dividing a measuring frequency region into two or more blocks:
      means for generating multi-sine waveforms obtained by combining sine waves of two or more frequencies in each block; and
      means for outputting said multi-sine waveforms to said communication line; and
   a reception side tester comprising:
      an analog to digital converter connected to another end of said communication line;
      a memory;
      a second controller for controlling said analog to digital converter and said memory;
      means for measuring said multi-sine waveforms in a most suitable measuring range for each block; and
      means for synthesizing a spectrum for each spectrum obtained for each of said blocks; wherein
   said multi-sine waveform generating means comprises
      means for generating multi-sine waveforms in the form of repeated waveforms; and further comprising
      means for applying Fourier transform processing to said multi-sine waveforms after subjecting said multi-sine waveforms to averaging.

7. The tester of claim 6, further comprising means for synchronizing said transmission side tester and said reception side tester using a circuit in each of said transmission side tester and said reception side tester thereby to implement communication through said communication line.

8. The tester of claim 6, further comprising means for overwriting a typical noise spectrum on a screen of a display where measured noise characteristics of said communication line is displayed.

9. The tester of claim 6, wherein said reception side tester further comprises means for determining data required for Fourier transform processing for maximum values within a preset interval; and means for accummulating in turn noise spectrum obtained by applying Fourier transform processing to said data.

10. A subscriber line tester for communication lines that convey high speed digital data, said tester comprising:
    a transmission side tester comprising:
       a signal generator connected to one end of a communication line;
       a first controller for controlling said signal generator;
       means for dividing a measuring frequency region into two or more blocks;
       means for generating multi-sine waveforms obtained by combining sine waves of two or more frequencies in each block; and
       means for outputting said multi-sine waveforms to said communication line; and
    a reception side tester comprising:
       an analog to digital converter connected to another end of said communication line;
       a memory;
       a second controller for controlling said analog to digital converter and said memory;
       means for measuring said multi-sine waveforms in a most suitable measuring range for each block; and means for synthesizing a spectrum from each spectrum obtained for each of said blocks; and further comprising:

means for overwriting a typical noise spectrum on a screen of a display where measured noise characteristics of said communication line is displayed.

11. The tester of claim 10, further comprising means for synchronizing said transmission side tester and said reception side tester using a circuit in each of said transmission side tester and said reception side tester thereby to implement communication through said communication line.

12. The tester of claim 10, wherein said reception side tester further comprises means for determining data required for Fourier transform processing for maximum values within a preset interval; and means for accummulating in turn noise spectrum obtained by applying Fourier transform processing to said data.

13. The tester of claim 10, further comprising means for over-writing one or more types of noise spectrum on said screen of said display.

14. The tester of claim 10, further comprising means for over-writing one type of noise spectrum on a screen of a display; and means for switching each type of noise spectrum by operating an input means.

* * * * *